US008811144B2

(12) United States Patent
Chatterjee et al.

(10) Patent No.: US 8,811,144 B2
(45) Date of Patent: Aug. 19, 2014

(54) USER EQUIPMENT (UE)-SPECIFIC ASSIGNMENT OF DEMODULATION REFERENCE SIGNAL (DMRS) SEQUENCES TO SUPPORT UPLINK (UL) COORDINATED MULTIPOINT (COMP)

(75) Inventors: Debdeep Chatterjee, Santa Clara, CA (US); Apostolos Papathanassiou, San Jose, CA (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 13/537,979

(22) Filed: Jun. 29, 2012

(65) Prior Publication Data

US 2013/0114523 A1 May 9, 2013

Related U.S. Application Data

(60) Provisional application No. 61/556,109, filed on Nov. 4, 2011.

(51) Int. Cl.
*H04W 80/04* (2009.01)
*H04W 88/06* (2009.01)
*H04W 28/04* (2009.01)
*H04W 72/04* (2009.01)

(52) U.S. Cl.
USPC .......................................... 370/208; 370/329

(58) Field of Classification Search
CPC . H04L 5/0007; H04L 27/2647; H04W 80/04; H04W 88/06; H04W 28/04; H04W 72/04
USPC .................. 370/203, 208, 328, 329
See application file for complete search history.

(56) References Cited

U.S. PATENT DOCUMENTS

2004/0125768 A1* 7/2004 Yoon et al. ..................... 370/331
2010/0210274 A1* 8/2010 Iwai et al. ...................... 455/450

(Continued)

FOREIGN PATENT DOCUMENTS

| KR | 10-2011-0112005 A | 10/2011 |
| WO | 2010/124716 A1 | 11/2010 |
| WO | 2011/007583 A1 | 1/2011 |
| WO | 2013/067463 A1 | 5/2013 |

OTHER PUBLICATIONS

International Search Report and Written Opinion received for PCT Patent Application No. PCT/US2012/063466 mailed on Mar. 25, 2013, 9 pages.

(Continued)

*Primary Examiner* — Ronald Abelson
(74) *Attorney, Agent, or Firm* — Thorpe North & Western LLP

(57) ABSTRACT

Technology for user equipment (UE)-specific assigning of demodulation reference signal (DM-RS) sequences to support uplink (UL) coordinated multipoint (CoMP) is disclosed. One method can include a DM-RS sequence assignment device sorting the plurality of UE into a list according to a number of reception point (RP) links for each UE in a CoMP set, and assigning a base DM-RS sequence and a cyclic shift (CS) to a top-ranked UE from the list. The top-ranked UE can have a highest number of RP links. The DM-RS sequence assignment device can repeatedly assign a different CS of the base DM-RS sequence to a plurality of unassigned UE in a same cell as the top-ranked UE, and repeatedly assign the different CS of the base DM-RS sequence to a plurality of unassigned UE in a cooperatively served cell of the top-ranked UE.

26 Claims, 6 Drawing Sheets

(56) References Cited

U.S. PATENT DOCUMENTS

| | | |
|---|---|---|
| 2011/0176502 A1 | 7/2011 | Chung et al. |
| 2011/0243066 A1* | 10/2011 | Nayeb Nazar et al. ....... 370/328 |
| 2011/0249648 A1 | 10/2011 | Jen |

OTHER PUBLICATIONS

International Preliminary Report on Patentability and Written Opinion received for PCT Patent Application No. PCT/US2012/063466, mailed on May 15, 2014, 6 pp.

* cited by examiner

USER EQUIPMENT (UE)-SPECIFIC ASSIGNMENT OF DEMODULATION REFERENCE SIGNAL (DMRS) SEQUENCES TO SUPPORT UPLINK (UL) COORDINATED MULTIPOINT (COMP)

RELATED APPLICATIONS

This application claims the benefit of and hereby incorporates by reference U.S. Provisional Patent Application Ser. No. 61/556,109, filed Nov. 4, 2011.

BACKGROUND

Wireless mobile communication technology uses various standards and protocols to transmit data between a node (e.g., transmission station) and a wireless device. Some wireless devices communicate using orthogonal frequency-division multiple access (OFDMA) in a downlink (DL) transmission and single carrier frequency division multiple access (SC-FDMA) in an uplink (UL) transmission. Standards and protocols that use OFDM and SC-FDMA modulation for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device (e.g., mobile device), known as a user equipment (UE). A downlink (DL) transmission can be a communication from the node station (or eNodeB) to the wireless device (or UE), and an uplink (UL) transmission can be a communication from the wireless device to the node.

In homogeneous networks (HomNets), the node, also called a macro node, can provide basic wireless coverage to wireless devices in a cell. The cell can be the area in which the wireless devices are operable to communicate with the macro node. Heterogeneous networks (HetNets) are used to handle the increased traffic loads on the macro nodes due to increased usage and functionality of wireless devices. HetNets can include a layer of planned high power macro nodes (or macro-eNBs) overlaid with layers of lower power nodes (micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes". The macro node can be used for basic coverage, and the low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

A Coordinated MultiPoint (CoMP) system may also be used to reduce interference from neighboring nodes in both homogeneous networks and HetNets. In the Coordinated MultiPoint (CoMP) system, the nodes, referred to as cooperating nodes, can also be grouped together with other nodes where the nodes from multiple cells can transmit signals to the wireless device and receive signals from the wireless device. The cooperating nodes can be nodes in the homogeneous network or macro nodes and/or lower power nodes (LPN) in the HetNet. CoMP operation can apply to downlink transmissions and uplink transmissions. Downlink CoMP operation can be divided into two categories: coordinated scheduling or coordinated beamforming (CS/CB or CS/CBF), and joint processing or joint transmission (JP/JT). With CS/CB, a given subframe can be transmitted from one cell to a given wireless device (e.g., UE), and the scheduling, including coordinated beamforming, is dynamically coordinated between the cells in order to control and/or reduce the interference between different transmissions. For joint processing, joint transmission can be performed by multiple cells to a wireless device (e.g., UE), in which multiple nodes transmit at the same time using the same time and frequency radio resources and/or dynamic cell selection. Uplink CoMP operation can be divided into two categories: joint reception (JR) and coordinated scheduling and beamforming (CS/CB). With JR, a physical uplink shared channel (PUSCH) transmitted by the wireless device (e.g., UE) can be received jointly at multiple points at a time frame. The set of the multiple points can constitute the CoMP reception point (RP) set, and can be included in part of UL CoMP cooperating set or in an entire UL CoMP cooperating set. JR can be used to improve the received signal quality. In CS/CB, user scheduling and precoding selection decisions can be made with coordination among points corresponding to the UL CoMP cooperating set. With CS/CB, PUSCH transmitted by the UE can be received at one point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
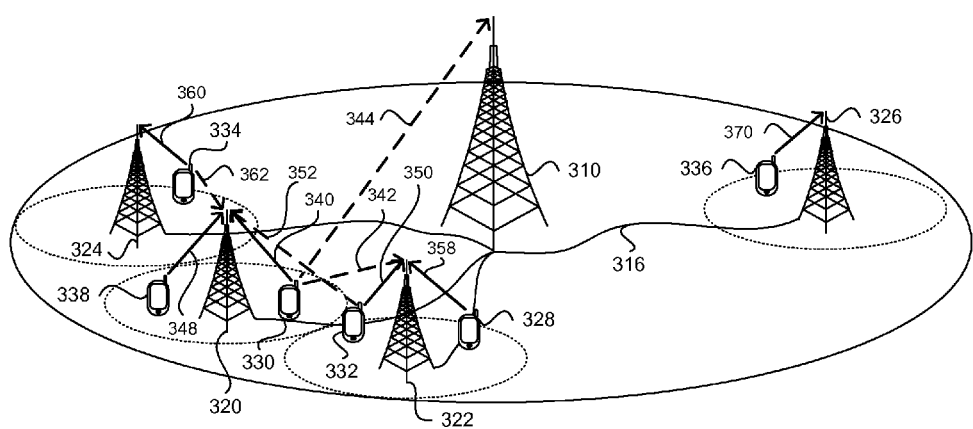
FIG. 1 illustrates a diagram of a heterogeneous network (HetNet) with a macro node, low power nodes (LPNs), and wireless devices using uplink (UL) joint reception (JR) coordinated multipoint (CoMP) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In uplink (UL) joint reception (JR) Coordinated MultiPoint (CoMP), significant performance gains can be achieved compared to non-CoMP operation by exploiting the broadcast nature of the wireless medium. However, each cooperation link can have a lower signal quality than a link to a serving cell because a pathloss of each cooperation link can be larger than a serving link. Therefore, a channel estimation (CE) quality of additional link(s) to the cooperating receiver(s) of a CoMP set can be valuable for obtaining significant gains through cooperation. For example, the CE performance for a link to a cooperating cell k may be severely affected by demodulation reference signal (DM-RS) transmissions of one or more wireless devices (e.g., UEs) served in the cooperating cell k, apart from the uplink DM-RS transmissions from other wireless devices (e.g., UEs) in the neighboring cells. As used herein, UE can refer to a single UE or a plurality of UEs. Consequently, more benefits from UL CoMP can be achieved by better orthogonality between DM-RS transmissions from wireless devices belonging to different cells within a CoMP set or by better realization of area splitting gains (e.g., in CoMP scenario 4 as described below). As used herein, the CoMP set can refer to a UL CoMP cooperating set.

The UL CoMP cooperating set can include a set of points that may be intended for data reception from a wireless device (e.g., UE). The UL CoMP cooperating set can include a set of points that perform channel estimation (CE) for scheduling based on sounding reference signal (SRS) transmissions (e.g., periodic SRS transmissions) from the wireless device. The set of points can be determined by a node (e.g., eNB) based on wireless device's feedback on a CoMP resource management (CRM) set or through measurement based on SRS transmissions in the UL at multiple points (e.g., reception points). The CRM set, if defined, can include a set of channel state information reference signals (CSI-RS) resources for which CSI-RS based received signal measurements can be made and reported by the wireless device. Such long-term measurements may be reported by the wireless device to convey information on nearby points to aid the node (or a core network) in determining the UL CoMP cooperating set. SRS transmissions can be configured so the network can measure the UL signal quality at potential RPs. The measurement information may be used to determine the UL signal quality of the UL CoMP cooperating set, in which case the CRM set may not be specifically defined or signaled for the wireless device. Within a CoMP signaling framework, the UL CoMP cooperating set can be considered UE-specific and may be set or changed semi-statically or dynamically via radio resource control (RRC) or media access control (MAC) signaling.

A CoMP reception point (RP) set can be a set of points that actively receives data from a wireless device (e.g., UE). The CoMP RP set can be a subset of the UL CoMP cooperating set. In JR, the CoMP RP set can include multiple points from the UL CoMP cooperating set. The constitution of the CoMP RP set may vary on a subframe timescale depending on the UL scheduling decisions at a node (e.g., eNB). Similar to the UL CoMP cooperating set, the CoMP RP set can be considered UE-specific.

Efficiently assigning UL DM-RS sequences to wireless devices within a coordinated multi-point (CoMP) set can improve orthogonality between DM-RS transmissions from wireless devices belonging to different cells within a CoMP set or provide higher area splitting gains (e.g., in CoMP scenario 4 as described below). UL DM-RS sequences can be assigned by selecting various UL DM-RS parameters (e.g. information relating to the sequence initialization seed, base sequence, cyclic shift (CS), or orthogonal cover code (OCC)). As used herein, CS can refer to a single CS or a plurality of CSs. The assignment of DM-RS base sequences can be cell-specific where multi-user multiple-input and multiple-output (MU-MIMO) wireless devices scheduled for PUSCH transmission in a cell can be assigned a same base sequence and different cyclic shifts (CS) to provide orthogonality between simultaneous DM-RS transmissions from wireless devices within a cell. A low correlation (e.g., greater interference or less orthogonality) can occur between DM-RS transmissions from inter-cell wireless device in UL CoMP system when different DM-RS base sequences are assigned to neighboring cells. Wireless devices with different base sequences can have less orthogonality (e.g., greater interference) than wireless devices with a same base sequence and different CS. However, in some deployments, like in CoMP scenario 4, where the macro cell and the LPNs in the macro cell coverage area can share a common physical cell ID (PCI), better CE performance can be achieved by exploiting area splitting gains and better interference averaging via assigning different DM-RS base sequences to UEs associated with nodes that may be geographically isolated from each other.

By assigning the same base sequences with different CS to cooperating cells for a wireless device via a systematic UE-specific DM-RS sequence assignment method, a significant improvement of a CE quality for the cooperating links can be achieved (i.e. a channel from a wireless device in one cell to another cooperating cell within the CoMP set), while maintaining good CE performance for the serving links in a same cell.

FIG. 1 illustrates a heterogeneous network (HetNet) with a macro node 310 and multiple low power nodes (LPNs) 320, 322, 324, and 326. The macro node can be connected to each LPN via backhaul link 316 using X2 interface or optical fiber connections. FIG. 1 illustrates scenario 3 CoMP configuration, where LPNs (e.g., remote radio heads (RRHs)) have different cell identifiers (IDs) from a macro node (e.g., eNB), or a scenario 4 CoMP configuration, where LPNs have a same cell IDs (e.g., CID) as a macro node. Although the term "cell" may be used herein, cell can also apply to scenarios, such CoMP scenario 4 where a CoMP set may include a macro node and multiple LPNs sharing a same cell ID (e.g., a same physical-layer cell identity or physical cell identity (PCI) $N_{ID}^{cell}$ from the perspective of the wireless device). As used herein, "cell" can refer to "points" (e.g., reception points) or "nodes", and a "home cell" can refer to an "uplink association point" (e.g., a wireless device can be associated with a point for UL transmissions that is different from the wireless device's downlink association points). In an example, an UL CoMP cooperating set can differ from a DL CoMP cooperating set.

In FIG. 1, a first wireless device 330 can be described in relation to the cells (e.g., nodes) in a network. For example, the CoMP set can include four cells 310, 320, 322, and 324 (e.g., nodes). The first wireless device 330 can have three (3) reception point links including a home link 340 to a home cell 320 (e.g., a home node) and cooperative links 342 and 344 to cooperatively served cells 322 and 310 (e.g., cooperatively served nodes). In an example, the link to the home cell can provide a strongest signal power. A second wireless device 338 can have a home link 348 to the home cell 320 of the first wireless device. The home cell can also provide links 352 (e.g., for a scheduled wireless device) to other wireless devices 332 (e.g., a third wireless device) in the cooperatively served cells 322 and provide links to other wireless devices 334 (e.g., a fourth wireless device) in a cooperatively served cell 324 (e.g., cooperatively served node). A cooperatively served cell of a wireless device (e.g., the first wireless device) can include a cell (e.g. nodes 322 and 324) within the CoMP set that has a scheduled wireless device (e.g., the third wireless device) that is cooperatively served by the home cell of the wireless device (e.g., the first wireless device). The cooperatively serving cell of a wireless device (e.g., the first wireless device) can include a cell (e.g., nodes 310 and 322) belonging to the CoMP RP set of the wireless device (e.g., the first wireless device) and cooperatively serving cell can be different from the wireless device's home cell (e.g., node 320). A cell (e.g., node 326) in the network may not be in a first wireless device's CoMP RP set.

From the perspective of the third wireless device 332, the third wireless device can have two (2) reception point links including a home link 350 to a home cell 322 (e.g., a home node) and a cooperative link 352 to a cooperatively serving cell 320 (e.g., a cooperatively serving node). A fifth wireless device 328 can have a home link 358 to the home cell 322 of the second wireless device. The fourth wireless device 334 can have a home link 360 to the home cell 324 of the fourth wireless device and a cooperative link 362 to the cooperatively serving cells 320 from the perspective of the fourth wireless device. In another example, a sixth wireless device 336 with a home link 370 to a cell (e.g., node 326) may include one cell (e.g., node 326) in the sixth wireless device's CoMP RP set or the wireless device 336 may not be configured for UL CoMP.

Referring back to UE-specific DM-RS sequence assignments, the base sequence planning for the network can be implemented to assign the same base sequences with different CS to cooperating cells. For UE-specific DM-RS sequence assignment, instead of reserving a single base sequence for each cell in the network, a set of N base sequences can be reserved for each CoMP set. The value of N can depend on a sum of a maximum number of MU-MIMO wireless devices (e.g., UE) considered in each cell of the CoMP set and a total number of CS available for each base sequence. For example, consider a maximum of two UEs being scheduled in each cell and a maximum of eight CS available for each base sequence. Hence, for the example in which a CoMP set is defined to include a macro cell and four low power nodes (LPN) for a HetNet (e.g., a maximum of ten UEs), N can equal two (e.g., N=2) base sequences per CoMP set (i.e., 2 base sequences×8 CS available for each base sequence=16 available sequences for the ten UEs in the CoMP set) can be reserved, which can correspond to a single macro cell coverage area, as illustrated by the example. The number of base sequences can be determined by the following equation: a number of base sequences times (×) a number of CS available for each base sequence can be greater than or equal to (≥) a number of wireless devices in a network area. The number of CS available may vary based on the minimum CS distance and the length of the base sequence.

Figure 2:
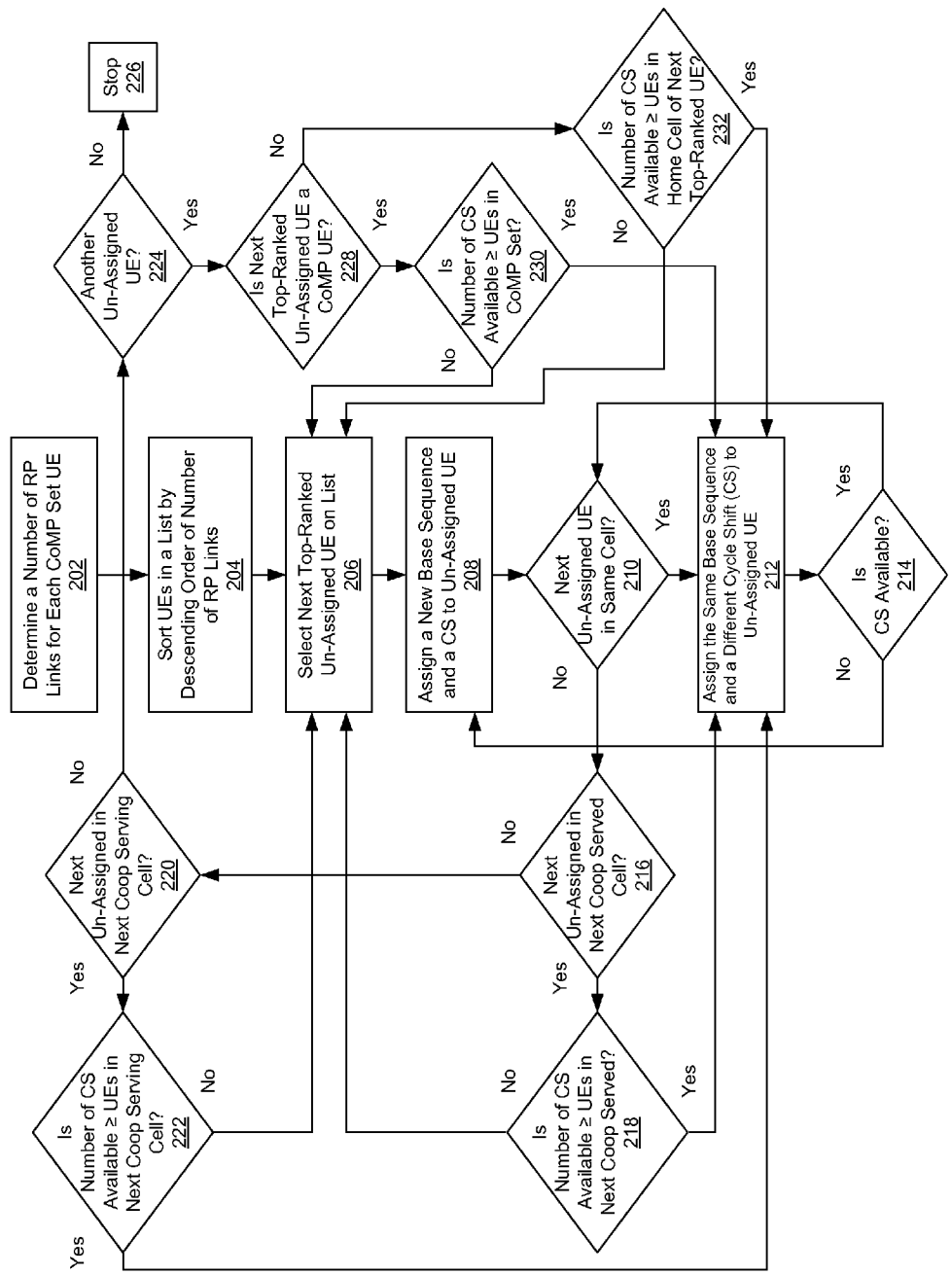
FIG. 2 depicts a flow chart for user equipment (UE)-specific assigning of demodulation reference signal (DM-RS) sequences to support uplink (UL) coordinated multipoint (CoMP) in accordance with an example.

FIG. 2 illustrates a process for assigning UE-specific demodulation reference signal (DM-RS) sequences, which can include the assignment of base sequences and CS to each wireless device (e.g. UE) in a network and/or a CoMP set. From the CoMP set information, the number of reception point (RP) link for each CoMP set UE can be determined 202. The UEs in the CoMP set can be sorted in a list (e.g. a RP link list) by descending order according to the number of links to the reception points (RP) 204. The top-ranked unassigned UE (e.g., the next top-ranked unassigned UE) from the RP link list can be selected 206. An unassigned UE can be a UE without a base sequence and/or a CS assignment. In another example (not shown), the UEs in the CoMP set can be sorted in a list by ascending order according to the number of RP links, and the lowest-ranked unassigned UE from the list can be selected.

Referring back to FIG. 2, a base sequence (from the pool of base sequences reserved for the CoMP set) and a CS can be assigned to the selected unassigned UE 208. The remaining unassigned UEs in the same cell (e.g., home cell of the UE assigned a base sequence and CS in the 208 step) can then be sorted into a list (e.g., a power gain list) based on descending order of long-term channel power gains (e.g., RSRP-type feedback from the UEs or SRS measurements) (step not shown in FIG. 2). The power gain list can be created and used on a per-cell basis (e.g., the UEs within a particular home cell, cooperatively served, or cooperatively serving cell can be sorted based on relative channel power gains within the specified cell (in contrast to a global power gain list across the entire CoMP set). A top-ranked unassigned UE from the power gain list in the home cell can be selected (step not shown in FIG. 2), where a top-ranked unassigned UE is a UE with a greatest long-term channel power gain. Next, if an unassigned UE in the same cell exists, an unassigned UE in a same cell can be determined 210 (i.e., if there is an unassigned UE in the power gain list). In another example, the remaining unassigned UE in the same cell can be sorted into a second list (e.g., a power gain list) based on an ascending order of channel pathloss values (e.g. based on RSRP-type feedback from the UEs or SRS measurements). A top-ranked unassigned UE from the power gain list in the home cell can be selected, where a top-ranked unassigned UE is a UE with the smallest channel pathloss value.

If a next unassigned UE in the power gain list in a home cell of the UE assigned in the 208 step exists, the same base sequence and a different cyclic shift (CS) can be assigned to next unassigned UEs 212 in the home cell (e.g. same cell) of the UE assigned a base sequence and CS in the 208 step. If another CS is available 214, the next unassigned UE in the power gain list in the same cell 210 (e.g., home cell) can be assigned the same base sequence and a different CS 212 in descending order of channel powers as the UE assigned the base sequence and the CS in the 208 step until the home cell UEs are assigned. If another CS is not available 214, the next unassigned UE in the home cell can be assigned a new (e.g., different) base sequence and a CS 208.

A cooperatively served cell for the top-ranked UE of the RP list that was assigned a DM-RS base sequence and CS in 208 can be selected. The selection may follow any specific criterion when a plurality of such cooperatively served cells for the top-ranked UE exist (e.g., the cooperatively served cells can be selected in an ascending order of unassigned UEs in each cooperatively served cell). If unassigned UEs in the selected cooperatively served cell 216 exist of the UE assigned in the 208 step, the unassigned UEs in the cooperatively served cell can be selected for assignment of DM-RS sequences, when the number of CS available (e.g. CS left) with the same base sequence is greater than or equal to the number of unassigned UEs in the cooperatively served cell 218 that is cooperatively served by the serving cell (e.g., home cell) of the UE assigned the base sequence and the CS in the 208 step. The UEs in the cooperatively served cell can then be sorted into a power gain list and the top-ranked unassigned UE from the power gain list can be selected. The selected unassigned UE can be assigned the same base sequence and a different CS 212 as the UE assigned the base sequence and the CS in the 208 step. If another CS is available 214, the next unassigned UE in the power gain list of the same cell 210 (e.g., the cooperatively served cell) can be assigned the same base sequence and a different CS 212 in descending order of channel powers as the UE assigned a base sequence in the 208 step until the cooperatively served cell UEs are assigned.

If unassigned UEs exist in the selected cooperatively served cell 216 of the UE assigned in the 208 step, and when the number of CS available with the same base sequence as the UE assigned (e.g., top-ranked UE) in the 208 step is less than the number of unassigned UE in the cooperatively served cell 218, a next top-ranked unassigned UE from the RP link list can be assigned a new (e.g., different) base sequence and a CS 208. The process described above can repeat again with the home cell being the serving cell of the next top-ranked UE.

Referring back to steps 216 and 218, if no unassigned UEs exist in the home cell or in the plurality of cooperatively served cell of the UE assigned in the 208 step (e.g., all the home cell UE and the cooperatively served cell have been assigned), a cooperatively serving cell for the UE assigned in the 208 step can be selected. The selection may follow any specific criterion when a plurality of such cooperatively serving cells for the top-ranked UE exist (e.g., the cooperatively serving cells could be selected in an ascending order of unassigned UEs in each cooperatively serving cell). If unassigned UEs exist in the selected cooperatively serving cell 220 of the UE assigned in the 208 step, the unassigned UEs in the cooperatively serving cell can be selected for assignment of DM-RS sequences, when the number of CS available with the same base sequence is greater than the number of unassigned UE in the cooperatively serving cell 222 of the UE assigned the base sequence and CS in the 208 step. The UEs in the cooperatively serving cell can then be sorted into a power gain list and the top-ranked unassigned UE from the power gain list can be selected. The selected unassigned UE can be assigned the same base sequence and a different CS 212 as the UE assigned the base sequence and the CS in the 208 step. If another CS is available 214, the next unassigned UE in the power gain list of the same cell 210 (e.g., the cooperatively serving cell) can be assigned the same base sequence and a different CS 212 in descending order of channel powers as the UE assigned a base sequence in the 208 step until the unassigned UEs in the cooperatively serving cell are assigned a DM-RS base sequence and CS.

If no unassigned UEs exist in the home cell or in the plurality of cooperatively served cell of the UE assigned in the 208 step (e.g., all the home cell UE and the cooperatively served cell have been assigned), and when the number of CS available with the same base sequence as the UE assigned (e.g., top-ranked UE) in the 208 step is less than the number of unassigned UE in the cooperatively serving cell 222, a next top-ranked unassigned UE from the RP link list can be assigned a new (e.g., different) base sequence and a CS 208. The process described above can repeat again with the home cell being the serving cell of the next top-ranked UE. Each UE assigned with a DM-RS sequence can be removed from the lists (e.g., the RP link list and the power gain list).

Referring back to step 220, when and/or if the home cell UEs, the cooperating served cell UEs, and cooperating serving cell UEs have been assigned with a same base sequence as the UE assigned in step 208, another unassigned UE can be determined from the RP link list 224. When no more unassigned UE is still on the list 224, the DM-RS sequence assignment process configured for UL CoMP sets can stop 226 until the DM-RS sequences are reassigned. If another unassigned UE is still on the list 224, a next top-ranked unassigned UE from the RP link list can be verified as a CoMP UE 228. In the embodiments, a CoMP UE can be a UE that has RP links to multiple nodes. In another example, a CoMP UE can include at least two cells in the CoMP RP set.

If the selected next top-ranked unassigned UE is not a CoMP UE 228, and if CS are still available for the base sequence and the number of CS left (e.g. CS available) is greater than or equal to the number of unassigned UEs in the home cell of the selected next top-ranked unassigned UE 232, the selected next top-ranked unassigned UE can be assigned the same base sequence and a different CS 212 as the UE assigned the base sequence and the CS in the 208 step. The remaining home UEs can be assigned the same base sequence and a different CS 212 as the UE assigned the base sequence and the CS in the 208 step in descending order of channel powers. If the selected next top-ranked unassigned UE is not a CoMP UE 228, and if the number of CS left (e.g. CS available) is less than the number of unassigned UEs in the home cell of the selected next top-ranked unassigned UE 232, the selected next top-ranked unassigned UE can be assigned a new (e.g., different) base sequence and a CS 208.

If the selected next top-ranked unassigned UE is a CoMP UE 228, and if CS are still available for the base sequence and the number of CS left (e.g. CS available) is greater than or equal to the number of unassigned UEs in the CoMP set of the selected next top-ranked unassigned UE 230, the selected next top-ranked unassigned UE can be assigned the same base sequence and a different CS 212 as the UE assigned the base sequence and the CS in the 208 step. The remaining unassigned UEs in the CoMP set can be assigned the same base sequence and a different CS 212 as the UE assigned the base sequence and the CS following the steps 212 through 226. If the selected next top-ranked unassigned UE is a CoMP UE 228, and if the number of CS left (e.g. CS available) is less than the number of unassigned UEs in the CoMP set of the selected next top-ranked unassigned UE 230, the selected next top-ranked unassigned UE can be assigned a new (e.g., different) base sequence and a CS 208.

Once the base sequences and CS for the scheduled UE in the CoMP set are determined, the scheduling and/or assignment decisions may be transmitted semi-statically to the UE via UE-specific RRC signaling or dynamically in an uplink-related downlink control information (DCI) carried by a physical downlink control channel (PDCCH) or via a combination of semi-static RRC signaling and dynamic signaling through the PDCCH. The flow chart of FIG. 2 can be modified and the lists (e.g. RP link list or power gain lists) can be reordered or a new list can be used based on other UL parameters to have different prioritizations and ensure reliable CE performance for the serving and cooperating links.

Figure 3:
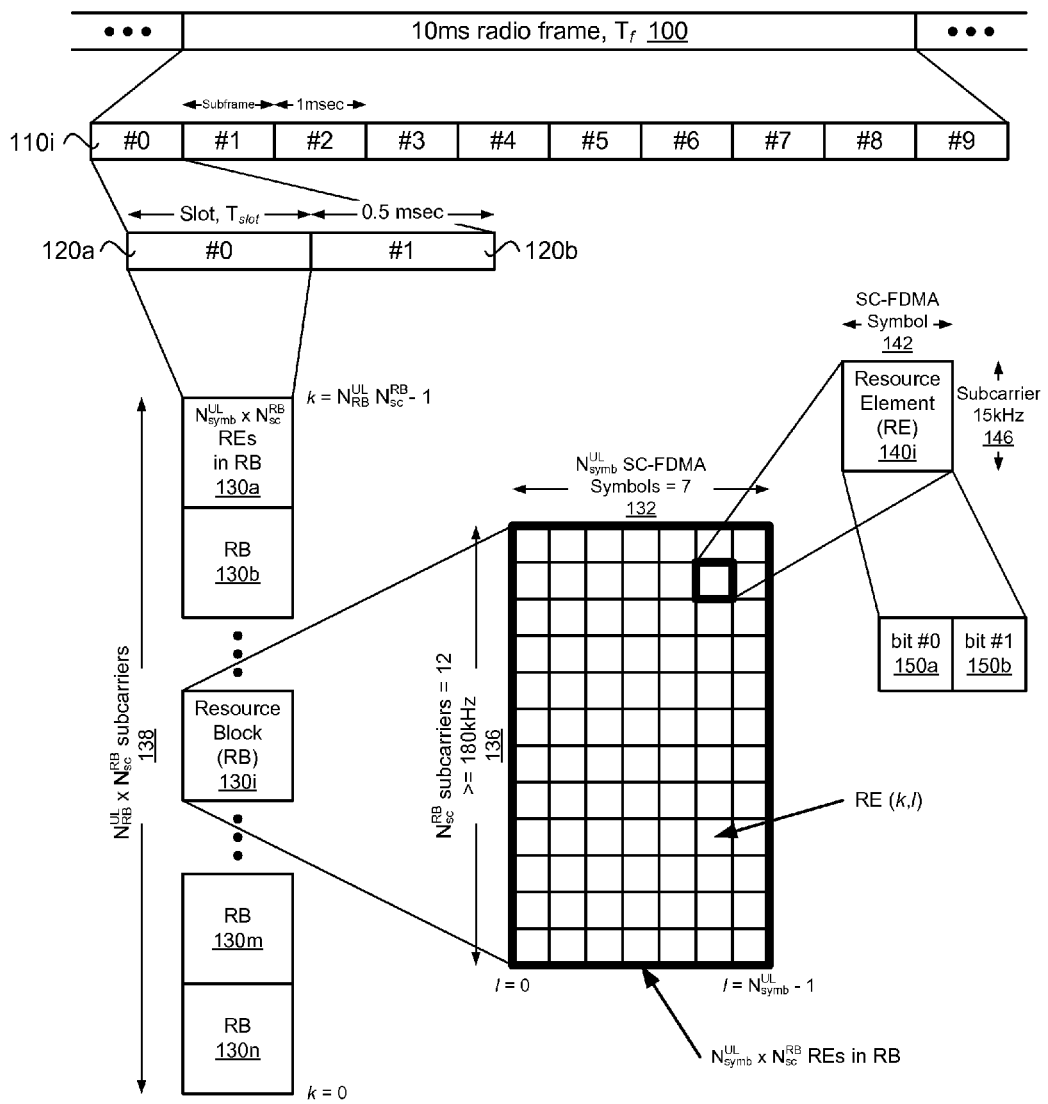
FIG. 3 illustrates a block diagram of uplink radio frame resource in accordance with an example.

A virtual cell identifier (VCID) can be used to derive the DM-RS base sequences, instead of deriving the DM-RS base sequence from the PCI $N_{ID}^{cell}$. The DM-RS sequences can be included in an uplink channel (e.g., a physical uplink shared channel (PUSCH)). In one example, the DM-RS can represent elements of a radio frame structure transmitted on the physical (PHY) layer in a uplink transmission between a node (e.g., eNodeB) and the wireless device (e.g., UE) using a generic long term evolution (LTE) frame structure, as illustrated in FIG. 3. While an LTE frame structure is illustrated, a frame structure for an IEEE 802.16 standard (WiMax), an IEEE 802.11 standard (WiFi), or another type of communication standard using SC-FDMA or OFDMA may also be used.

FIG. 3 illustrates an uplink radio frame structure. In the example, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 130$a$, 130$b$, 130$i$, 130$m$, and 130$n$ based on the CC frequency bandwidth. Each RB (physical RB or PRB) 130$i$ can include 12-15 kHz subcarriers 136 (on the frequency axis) and 6 or 7 SC-FDMA symbols 132 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one SC-FDMA symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

Reference signals can be transmitted by SC-FDMA symbols via resource elements in the resource blocks. Reference signals (or pilot signals or tones) can be a known signal used for various reasons, such as to synchronize timing, estimate a channel, and/or noise in the channel. Reference signals can be received and transmitted by wireless devices and nodes. Different types of reference signals (RS) can be used in a RB. For example, in LTE systems, uplink reference signal types can include a sounding reference signal (SRS) and a UE-specific reference signal (UE-specific RS or UE-RS) or a demodulation reference signal (DM-RS).

The UE-specific DM-RS sequence assignment process described can provide a systematic method to assign base sequences and CS, which can significantly improve the CE quality for cooperating links (i.e. the channel from a UE in one cell to another cooperating cell within the CoMP set) via better inter-cell orthogonalization of DM-RS transmissions or better area splitting gains (e.g., in CoMP scenario 4 as described previously), while maintaining good CE performance for the serving links (e.g., home links) by ensuring orthogonality between the DM-RS transmissions from MU-MIMO UEs within a cell. For some examples, a CoMP set can comprise of a large number of cells with MU-MIMO. Assigning the same base sequence and different CS to all UE in the CoMP set may not be possible because a limited number of CS may be available, which can used to achieve orthogonality between DM-RS sequences. The UE-specific DM-RS sequence assignment described can improve reliable CE performance for both serving and cooperating links compared to an alternative DM-RS sequence assignment process based on cell-specific DM-RS base sequence assignment or a single cell non-CoMP DM-RS sequence assignment process. For networks with a small number of cells and/or a small number UEs in the CoMP set, where assigning a same base sequence and different CS to UEs in a CoMP set may be feasible, the UE-specific DM-RS sequence assignment described can automatically provide and efficient and/or optimal DM-RS sequence assignment for the network. In an example, the UE-specific DM-RS sequence assignment described can provide assignment for both CoMP and non-CoMP configurations.

Figure 4:
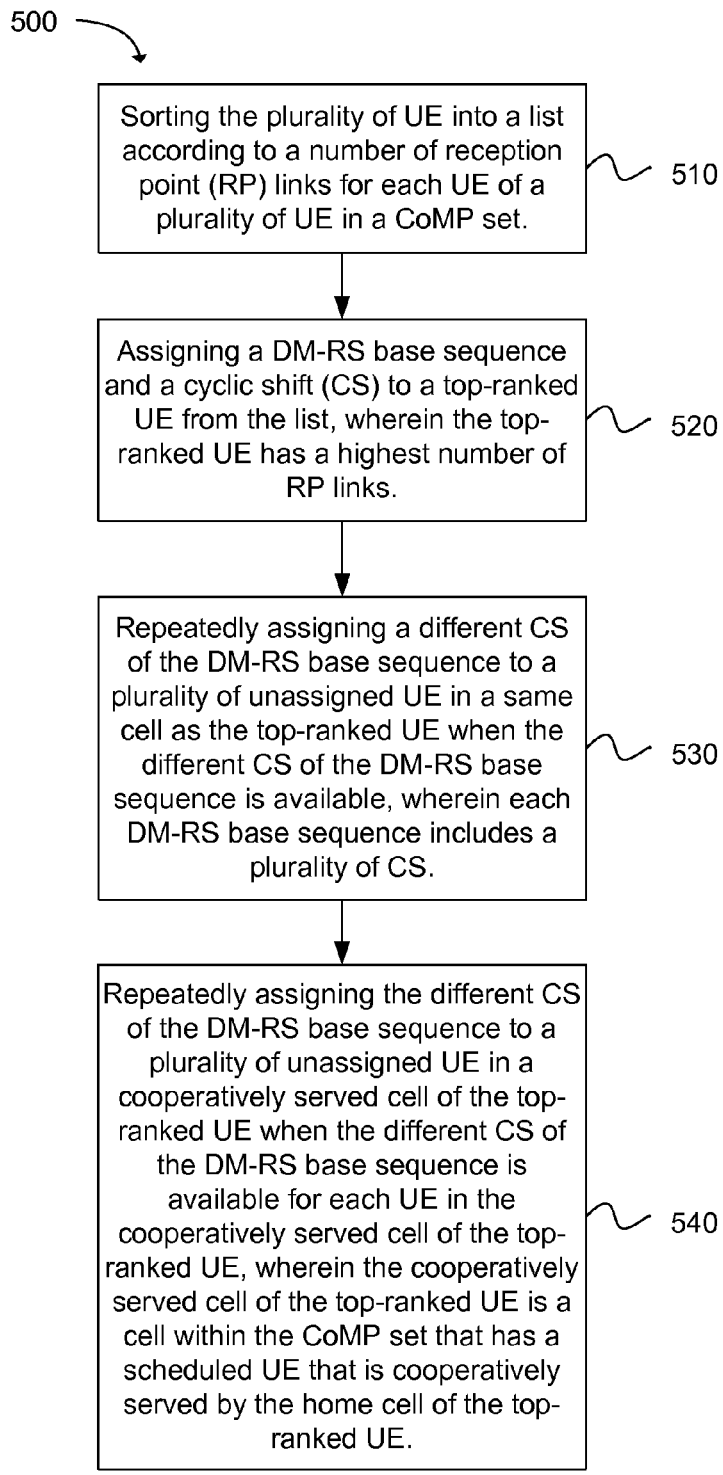
FIG. 4 depicts a flow chart of a method for user equipment (UE)-specific assigning of demodulation reference signal (DM-RS) sequences to support uplink (UL) coordinated multipoint (CoMP) in accordance with an example.

Another example provides a method 500 for user equipment (UE)-specific assigning of demodulation reference signal (DM-RS) sequences to support uplink (UL) coordinated multipoint (CoMP), as shown in the flow chart in FIG. 4. The method may be executed as instructions on a machine, where the instructions are included on at least one computer readable medium or one non-transitory machine readable storage medium. The method includes the operation of sorting the plurality of UE scheduled for uplink transmission (e.g., PUSCH transmission) into a list according to a number of reception point (RP) links for each UE of a plurality of UE in a CoMP set, as in block 510. The operation of assigning a DM-RS base sequence and a cyclic shift (CS) to a top-ranked UE from the list, wherein the top-ranked UE has a highest number of RP links follows, as in block 520. The next operation of the method can be repeatedly assigning a different CS of the DM-RS base sequence to a plurality of unassigned UE in a same cell as the top-ranked UE when the different CS of the DM-RS base sequence is available, wherein each DM-RS base sequence includes a plurality of CS, as in block 530. The method can further include repeatedly assigning the different CS of the DM-RS base sequence to a plurality of unassigned UE in a cooperatively served cell of the top-ranked UE when the different CS of the DM-RS base sequence is available for each unassigned UE in the cooperatively served cell of the top-ranked UE, wherein the cooperatively served cell of the top-ranked UE is a cell within the CoMP set that has a scheduled UE that is cooperatively served by the home cell of the top-ranked UE, as in block 540.

In an example, a demodulation reference signal (DM-RS) sequence assignment device can be used to support uplink (UL) coordinated multipoint (CoMP). The DM-RS sequence assignment device can be figured to implement the operations of the method illustrated in FIG. 4.

Figure 5:
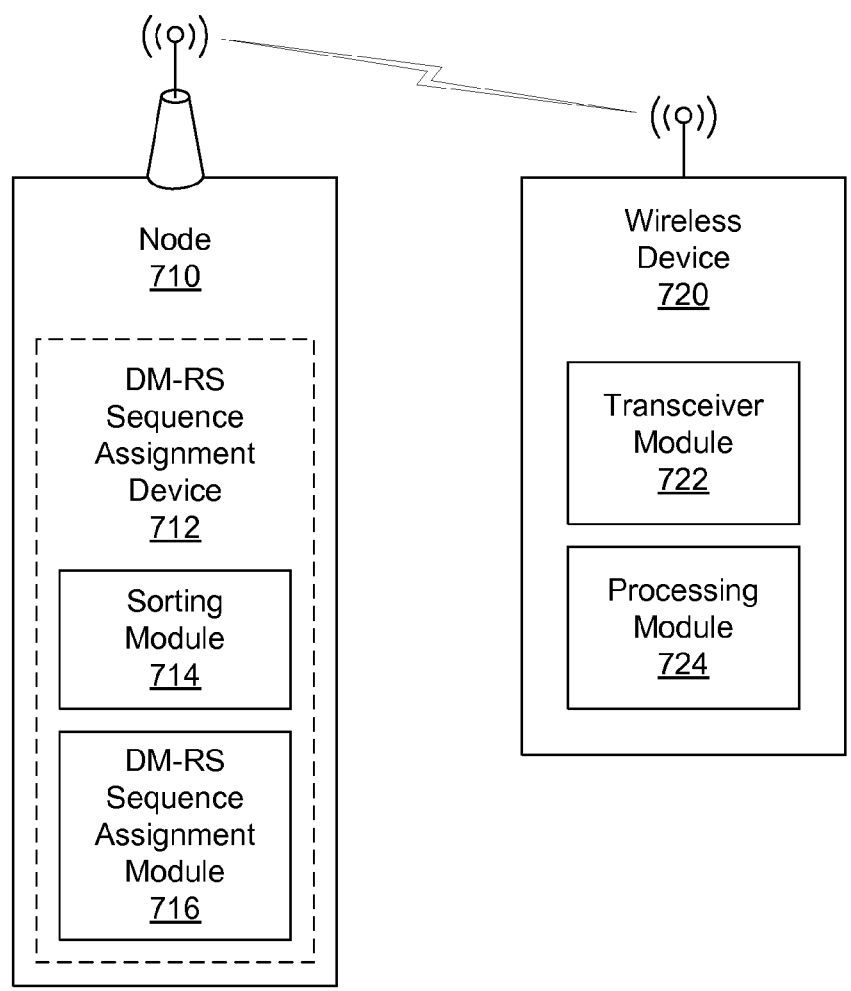
FIG. 5 illustrates a block diagram of a node and wireless device in accordance with an example.

FIG. 5 illustrates an example of a node 710 and a wireless device 720 and node 710. The node can be configured to communicate with the wireless device in a wireless broadband network. The wireless device can include a transceiver module 722 and a processing module 724. The node 710 (or an evolved packet core (EPC) or core network (CN) [not shown]) can include the DM-RS sequence assignment device 712. The DM-RS sequence assignment device can include a sorting module 714 and a DM-RS sequence assignment module 716. The sorting module can be configured to sort the plurality of UE into a list according to a number of reception point (RP) links for each UE of a plurality of UE in a CoMP set. The DM-RS sequence assignment module can be configured to assign a DM-RS base sequence and CS to a top-ranked UE from the list. The top-ranked UE can have a highest number of RP links. The DM-RS sequence assignment module can be further configured to repeatedly assign a different cyclic shift (CS) of the DM-RS base sequence to a plurality of unassigned UE in a same cell as the top-ranked UE when the different CS of the DM-RS base sequence is available, and repeatedly assign the different CS of the DM-RS base sequence to a plurality of unassigned UE in a cooperatively served cell of the top-ranked UE when the different CS of the DM-RS base sequence is available for each UE in the cooperatively served cell of the top-ranked UE. Each DM-RS base sequence can include a plurality of CS. The cooperatively served cell of the top-ranked UE can be a cell within the CoMP set that has a scheduled UE that is cooperatively served by the home cell of the top-ranked UE.

When the different CS of the DM-RS base sequence is not available for each UE in the cooperatively served cell of the top-ranked UE, the method can further include (or the DM-RS sequence assignment module can be further configured for) assigning a different DM-RS base sequence and a CS to a next top-ranked UE from the list. The next top-ranked UE can have a highest number of RP links from remaining UE on the list. When the different CS of the different DM-RS base sequence is available, the method can further include (or the DM-RS sequence assignment module can be further configured for) repeatedly assigning a different cyclic shift (CS) of the different DM-RS base sequence to a plurality of unassigned UE in a home cell of the next top-ranked UE. When the different CS of the different DM-RS base sequence is available, the method can further include (or the DM-RS sequence assignment module can be further configured for) repeatedly assigning a different CS of the different DM-RS base sequence to the plurality of unassigned UE in the cooperatively served cell of the next top-ranked UE. A cooperatively served cell of the next top-ranked UE can be a cell within the CoMP set that has a scheduled UE that is cooperatively served by the home cell of the next top-ranked UE.

In another example, the operation of repeatedly assigning the different CS of the DM-RS base sequence to the plurality of unassigned UE is based on a descending order of a long-term channel power gain of each UE to a corresponding home cell of the UE or a substantially equivalent metric (e.g., a reference signal received power (RSRP) of each UE to a home cell). The sorting module can be further configured to sort the plurality of unassigned UE based on a descending order of a long-term channel power gain of each UE to a corresponding home cell of the UE or a substantially equivalent metric prior to the DM-RS sequence assignment module repeatedly assigning the different CS of the new DM-RS base sequence.

In another configuration, the method can further include (or the DM-RS sequence assignment module can be further configured for) reserving a set of N DM-RS base sequences for the CoMP set. N can represent an integer that is at least greater than or equal to a maximum number of co-scheduled UE in the CoMP set divided by a number of available CS for each DM-RS base sequence. The set of N DM-RS base sequences can include the DM-RS base sequences generated by the physical cell identifier (PCI) of the cells within the CoMP set. The method can further include (or the DM-RS sequence assignment module or the sorting module can be further configured for) removing a UE from the list when the DM-RS base sequence and the CS are assigned to the UE.

In another example, when the different CS of the DM-RS base sequence is not available for each UE in a cooperatively serving cell of the top-ranked UE, the method can further include (or the DM-RS sequence assignment module can be further configured for) assigning a different DM-RS base sequence and a CS to a next top-ranked UE from the list. The cooperatively serving cell of a UE can be a cell belonging to an CoMP RP set of the UE and can be different from the UE's home cell. The next top-ranked UE can have a highest number of RP links from remaining UE on the list. When the different CS of the different DM-RS base sequence is available, the method can further include (or the DM-RS sequence assignment module can be further configured for) repeatedly assigning a different cyclic shift (CS) of the different DM-RS base sequence to a plurality of unassigned UE in a home cell of the next top-ranked UE. When the different CS of the different DM-RS base sequence is available, the method can further include (or the DM-RS sequence assignment module can be further configured for) repeatedly assigning a different CS of the different DM-RS base sequence to the plurality of unassigned UE in the cooperatively served cell of the next top-ranked UE. A cooperatively served cell of the next top-ranked UE can be a cell within the CoMP set that has a scheduled UE that is cooperatively served by the home cell of the next top-ranked UE. In another example, when the different CS of the DM-RS base sequence is available for each UE in the cooperatively serving cell of the top-ranked UE, the method can further include (or the DM-RS sequence assignment module can be further configured for) repeatedly assigning the different CS of the DM-RS base sequence to a plurality of unassigned UE in a cooperatively serving cell of the top-ranked UE. The cooperatively serving cell of a UE can be a cell belonging to the CoMP RP set of the UE and is different from the UE's home cell.

In another configuration, the method can further include (or the DM-RS sequence assignment module can be further configured for) selecting a next top-ranked UE from the list. The next top-ranked UE has a highest number of RP links from remaining UE on the list. When the different CS of the DM-RS base sequence is available for each remaining unassigned UE in the CoMP set and when the next top-ranked UE has at least two cells in the next top-ranked UE's CoMP RP set, the method can further include (or the DM-RS sequence assignment module can be further configured for) repeatedly assigning the different CS of the DM-RS base sequence to a plurality of remaining unassigned UE in a CoMP set. When the different CS of the DM-RS base sequence is not available for each remaining unassigned UE in a CoMP set and when the next top-ranked UE has at least two cells in the next top-ranked UE's CoMP RP set, the method can further include (or the DM-RS sequence assignment module can be further configured for) assigning a different DM-RS base sequence and a CS to the next top-ranked UE. When the different CS of the different DM-RS base sequence is available, the method can further include (or the DM-RS sequence assignment module can be further configured for) repeatedly assigning a different CS of the different DM-RS base sequence to the plurality of remaining unassigned UE in a next top-ranked UE's home cell, a next top-ranked UE's cooperatively served cell, and then a next top-ranked UE's cooperatively serving cells.

In another configuration, the method can further include (or the DM-RS sequence assignment module can be further configured for) selecting a next top-ranked UE from the list. The next top-ranked UE has a highest number of RP links from remaining UE on the list. When the different CS of the DM-RS base sequence is available for each unassigned UE in the home cell and when the next top-ranked UE has only one cell in the next top-ranked UE's CoMP RP set or the next top-ranked UE is not configured for UL CoMP, the method can further include (or the DM-RS sequence assignment module can be further configured for) repeatedly assigning the different CS of the DM-RS base sequence to a plurality of unassigned UE in a home cell of the next top-ranked UE. When the different CS of the DM-RS base sequence is not available for each unassigned UE in the home cell of the next-top ranked UE (including when the next top-ranked UE has only one cell in its CoMP RP set or is not configured for UL CoMP), the method can further include (or the DM-RS sequence assignment module can be further configured for) assigning a new DM-RS base sequence and a CS to the next top-ranked UE. When the different CS of the new DM-RS base sequence is available, the method can further include (or the DM-RS sequence assignment module can be further configured for) repeatedly assigning a different CS of the new DM-RS base sequence to the plurality of remaining unassigned UE in a next top-ranked UE's home cell, a next top-ranked UE's cooperatively served cell, and then a next top-ranked UE's cooperatively serving cells.

In an example, the DM-RS base sequence can be determined or generated based on a virtual cell identifier (VCID). The number of CS for each DM-RS base sequence can be less than or equal to the number that is determined by a specific number of bits used to indicate the CS choice in an uplink-related downlink control information (DCI) format. The method can further include (or the DM-RS sequence assignment device or node can be further configured for) applying the DM-RS base sequence and the CS in a physical uplink shared channel (PUSCH) for a specific UE in the CoMP set. The DM-RS sequence assignment device can be included in an evolved packet core (EPC), a core network (CN), or a node. The node can include a base station (BS), a Node B (NB), an evolved Node B (eNB), a baseband unit (BBU), a remote radio head (RRH), a remote radio equipment (RRE), or a remote radio unit (RRU). The BBU, RHH, RRE, or RRU can be features of a centralized, cooperative, or cloud radio access network (C-RAN or CRAN). The node can include a macro node, a low power node (LPN), a macro evolved Node B (macro-eNB), a micro-eNB, a pico-eNB, a femto-eNB, or a home eNB (HeNB).

In an example, the transceiver module 722 of the wireless device 720 can receive a VCID and CS related information and determine the DM-RS base sequence and a CS specified for the wireless device via RCC signaling, MAC signaling, DCI carried by the PDCCH or any combination of these signaling methods. The processing module 724 can generate the DM-RS sequence using the base sequence, the CS, and other related hopping pattern information. The transceiver module can transmit the PUSCH with the generated DM-RS.

The wireless device can include a user equipment (UE) or a mobile station (MS) configured to connect to a wireless local area network (WLAN), a wireless personal area network (WPAN), or a wireless wide area network (WWAN). The narrow bandwidth wireless device can include an antenna, a touch sensitive display screen, a speaker, a microphone, a graphics processor, an application processor, internal memory, a non-volatile memory port, or combinations these components. The narrow bandwidth wireless device can belong to a class of a machine type communication (MTC) device.

Figure 6:
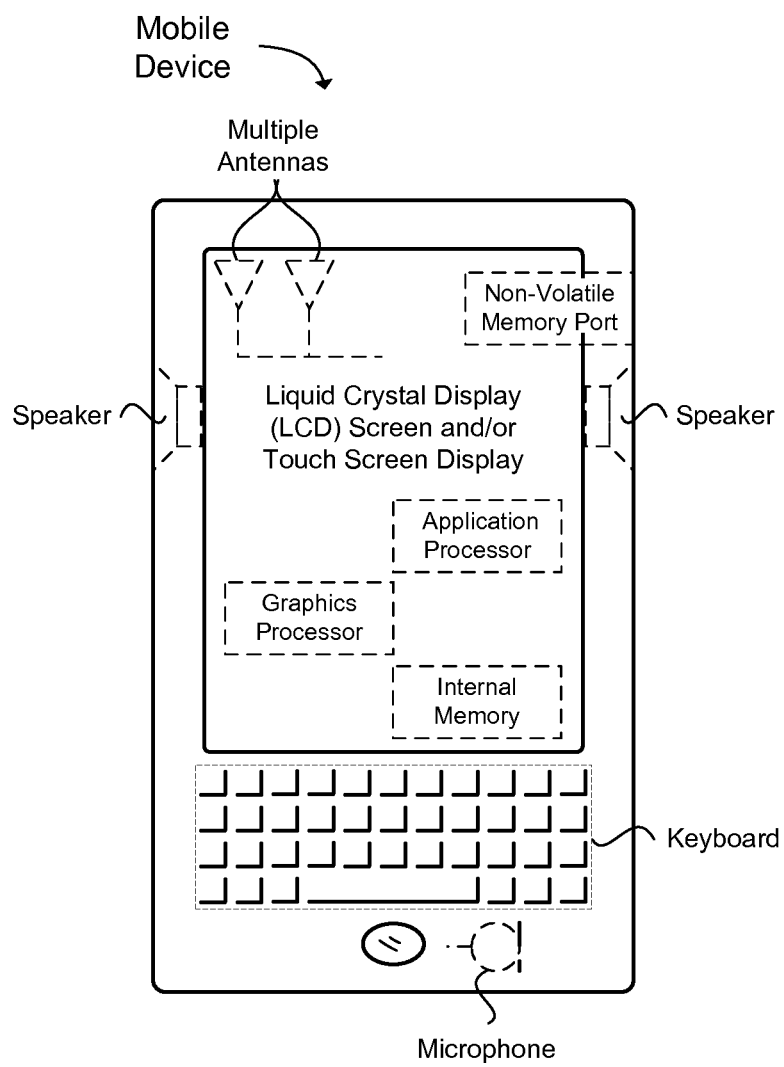
FIG. 6 illustrates a diagram of a wireless device in accordance with an example.

FIG. 6 provides an example illustration of the wireless device, such as a user equipment (UE), a mobile station (MS), a mobile wireless device, a mobile communication device, a tablet, a handset, or other type of mobile wireless device. The wireless device can include one or more antennas configured to communicate with a node, such as a macro node, a low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 6 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. At least one non-transitory machine readable storage medium comprising a plurality of instructions adapted to be executed to implement the method for user equipment (UE)-specific assigning of demodulation reference signal (DM-RS) sequences to support uplink (UL) coordinated multipoint (CoMP), comprising:

sorting the plurality of UE into a list according to a number of reception point (RP) links for each UE of a plurality of UE in a CoMP set;

assigning a DM-RS base sequence and a cyclic shift (CS) to a top-ranked UE from the list, wherein the top-ranked UE has a highest number of RP links;

repeatedly assigning a different CS of the DM-RS base sequence to a plurality of unassigned UE in a same cell as the top-ranked UE when the different CS of the DM-RS base sequence is available, wherein each DM-RS base sequence includes a plurality of CS; and repeatedly assigning the different CS of the DM-RS base sequence to a plurality of unassigned UE in a cooperatively served cell of the top-ranked UE when the different CS of the DM-RS base sequence is available for each UE in the cooperatively served cell of the top-ranked UE, wherein the cooperatively served cell of the top-ranked UE is a cell within the CoMP set that has a scheduled UE that is cooperatively served by the home cell of the top-ranked UE.

2. The machine readable storage medium of claim 1, further comprising:

assigning a different DM-RS base sequence and a CS to a next top-ranked UE from the list when the different CS of the DM-RS base sequence is not available for each UE in the cooperatively served cell of the top-ranked UE, wherein the next top-ranked UE has a highest number of RP links from remaining UE on the list;

repeatedly assigning a different cyclic shift (CS) of the different DM-RS base sequence to a plurality of unassigned UE in a home cell of the next top-ranked UE when the different CS of the different DM-RS base sequence is available; and repeatedly assigning a different CS of the different DM-RS base sequence to the plurality of unassigned UE in the cooperatively served cell of the next top-ranked UE when the different CS of the different DM-RS base sequence is available, wherein a cooperatively served cell of the next top-ranked UE is a cell within the CoMP set that has a scheduled UE that is cooperatively served by the home cell of the next top-ranked UE.

3. The machine readable storage medium of claim 1, wherein repeatedly assigning the different CS of the DM-RS base sequence to the plurality of unassigned UE is based on a descending order of a long-term channel power gain of each UE to a corresponding home cell of the UE or a substantially equivalent metric.

4. The machine readable storage medium of claim 1, further comprising:

reserving a set of N DM-RS base sequences for the CoMP set, wherein N represents an integer that is at least greater than or equal to a maximum number of co-scheduled UE in the CoMP set divided by a number of available CS for each DM-RS base sequence, wherein the set of N DM-RS base sequences includes the DM-RS base sequences generated by the physical cell identifier (PCI) of the cells within the CoMP set.

5. The machine readable storage medium of claim 1, further comprising:

removing a UE from the list when the DM-RS base sequence and the CS are assigned to the UE.

6. The machine readable storage medium of claim 1, further comprising:

assigning a different DM-RS base sequence and a CS to a next top-ranked UE from the list when the different CS of the DM-RS base sequence is not available for each UE in a cooperatively serving cell of the top-ranked UE, wherein the cooperatively serving cell of a UE is a cell belonging to a CoMP RP set of the UE and is different from the UE's home cell, and the next top-ranked UE has a highest number of RP links from remaining UE on the list;
repeatedly assigning a different cyclic shift (CS) of the different DM-RS base sequence to a plurality of unassigned UE in a home cell of the next top-ranked UE when the different CS of the different DM-RS base sequence is available; and
repeatedly assigning a different CS of the different DM-RS base sequence to the plurality of unassigned UE in the cooperatively served cell of the next top-ranked UE when the different CS of the different DM-RS base sequence is available, wherein a cooperatively served cell of the next top-ranked UE is a cell within the CoMP set that has a scheduled UE that is cooperatively served by the home cell of the next top-ranked UE.

7. The machine readable storage medium of claim 1, further comprising:
repeatedly assigning the different CS of the DM-RS base sequence to a plurality of unassigned UE in a cooperatively serving cell of the top-ranked UE when the different CS of the DM-RS base sequence is available for each UE in the cooperatively serving cell of the top-ranked UE, wherein the cooperatively serving cell of a UE is a cell belonging to a CoMP RP set of the UE and is different from the UE's home cell.

8. The machine readable storage medium of claim 7, further comprising:
selecting a next top-ranked UE from the list, wherein the next top-ranked UE has a highest number of RP links from remaining UE on the list; and
repeatedly assigning the different CS of the DM-RS base sequence to a plurality of remaining unassigned UE in a CoMP set when the different CS of the DM-RS base sequence is available for each remaining unassigned UE in the CoMP set, and when the next top-ranked UE has at least two cells in a next top-ranked UE's CoMP RP set.

9. The machine readable storage medium of claim 7, further comprising:
selecting a next top-ranked UE from the list, wherein the next top-ranked UE has a highest number of RP links from remaining UE on the list; and
assigning a different DM-RS base sequence and a CS to the next top-ranked UE when the different CS of the DM-RS base sequence is not available for each remaining unassigned UE in a CoMP set, and when the next top-ranked UE has at least two cells in the next top-ranked UE's CoMP RP set; and
repeatedly assigning a different CS of the different DM-RS base sequence to the plurality of remaining unassigned UE in a next top-ranked UE's home cell, a next top-ranked UE's cooperatively served cell, and then a next top-ranked UE's cooperatively serving cells when the different CS of the different DM-RS base sequence is available.

10. The machine readable storage medium of claim 7, further comprising:
selecting a next top-ranked UE from the list, wherein the next top-ranked UE has A highest number of RP links from remaining UE on the list; and
repeatedly assigning the different CS of the DM-RS base sequence to a plurality of unassigned UE in a home cell of the next top-ranked UE when the different CS of the DM-RS base sequence is available for each unassigned UE in the home cell, and when the next top-ranked UE has only one cell in a next top-ranked UE's CoMP RP set or the next top-ranked UE is not configured for UL CoMP.

11. The machine readable storage medium of claim 7, further comprising:
selecting a next top-ranked UE from the list, wherein the next top-ranked UE has a highest number of RP links from remaining UE on the list;
assigning a new DM-RS base sequence and a CS to the next top-ranked UE when the different CS of the DM-RS base sequence is not available for each unassigned UE in the home cell of the next-top ranked UE, wherein the next top-ranked UE has only one cell in a next top-ranked UE's CoMP RP set or the next top-ranked UE is not configured for UL CoMP; and
repeatedly assigning a different CS of the new DM-RS base sequence to the plurality of remaining unassigned UE in a next top-ranked UE's home cell, a next top-ranked UE's cooperatively served cell, and then a next top-ranked UE's cooperatively serving cells when the different CS of the new DM-RS base sequence is available.

12. The machine readable storage medium of claim 1, wherein the DM-RS base sequence is determined based on a virtual cell identifier (VCID).

13. The machine readable storage medium of claim 1, wherein the number of CS for each DM-RS base sequence is less than or equal to the number that is determined by a specific number of bits used to indicate the CS choice in an uplink-related downlink control information (DCI) format.

14. The machine readable storage medium of claim 1, further comprising:
applying the DM-RS base sequence and the CS in a physical uplink control channel (PUCCH) or a physical uplink shared channel (PUSCH) for a specific UE in the CoMP set.

15. A demodulation reference signal (DM-RS) sequence assignment device to support uplink (UL) coordinated multipoint (CoMP), comprising:
a sorting module configured to sort the plurality of UE into a list according to a number of reception point (RP) links for each UE of a plurality of UE in a CoMP set; and
a DM-RS sequence assignment module configured to assign a DM-RS base sequence and CS to a top-ranked UE from the list, wherein the top-ranked UE has a highest number of RP links, and
further configured to repeatedly assign a different cyclic shift (CS) of the DM-RS base sequence to a plurality of unassigned UE in a same cell as the top-ranked UE when the different CS of the DM-RS base sequence is available, wherein each DM-RS base sequence includes a plurality of CS, and
repeatedly assign the different CS of the DM-RS base sequence to a plurality of unassigned UE in a cooperatively served cell of the top-ranked UE when the different CS of the DM-RS base sequence is available for each UE in the cooperatively served cell of the top-ranked UE, wherein the cooperatively served cell of the top-ranked UE is a cell within the CoMP set that has a scheduled UE that is cooperatively served by the home cell of the top-ranked UE.

16. The DM-RS sequence assignment device of claim 15, wherein DM-RS sequence assignment module is further configured to:
assign a different DM-RS base sequence and a CS to a next top-ranked UE from the list when the different CS of the DM-RS base sequence is not available for each UE in the cooperatively served cell of the top-ranked UE, wherein the next top-ranked UE has a highest number of RP links from remaining UE on the list;

repeatedly assign a different cyclic shift (CS) of the different DM-RS base sequence to a plurality of unassigned UE in a home cell of the next top-ranked UE when the different CS of the different DM-RS base sequence is available; and repeatedly assign a different CS of the different DM-RS base sequence to the plurality of unassigned UE in the cooperatively served cell of the next top-ranked UE when the different CS of the different DM-RS base sequence is available, wherein a cooperatively served cell of the next top-ranked UE is a cell within the CoMP set that has a scheduled UE that is cooperatively served by the home cell of the next top-ranked UE.

17. The DM-RS sequence assignment device of claim 15, wherein the sorting module is further configured to sort the plurality of unassigned UE based on a descending order of a long-term channel power gain of each UE to a corresponding home cell of the UE or a substantially equivalent metric prior to the DM-RS sequence assignment module repeatedly assigning the different CS of the new DM-RS base sequence.

18. The DM-RS sequence assignment device of claim 15, wherein DM-RS sequence assignment module is further configured to:

reserve a set of N DM-RS base sequences for the CoMP set, wherein N represents an integer that is at least greater than or equal to a maximum number of co-scheduled UE in the CoMP set divided by a number of available CS for each DM-RS base sequence, wherein the set of N DM-RS base sequences includes the DM-RS base sequences generated by the physical cell identifier (PCI) of the cells within the CoMP set.

19. The DM-RS sequence assignment device of claim 15, wherein DM-RS sequence assignment module is further configured to:

remove a UE from the list when the DM-RS base sequence and the CS are assigned to the UE.

20. The DM-RS sequence assignment device of claim 15, wherein DM-RS sequence assignment module is further configured to:

repeatedly assign the different CS of the DM-RS base sequence to a plurality of unassigned UE in a cooperatively serving cell of the top-ranked UE when the different CS of the DM-RS base sequence is available for each UE in the cooperatively serving cell of the top-ranked UE, wherein the cooperatively serving cell of a UE is a cell belonging to a CoMP RP set of the UE and is different from the UE's home cell;

assign a different DM-RS base sequence and a CS to a next top-ranked UE from the list when the different CS of the DM-RS base sequence is not available for each UE in a cooperatively serving cell of the top-ranked UE, and the next top-ranked UE has a highest number of RP links from remaining UE on the list, repeatedly assign a different cyclic shift (CS) of the different DM-RS base sequence to a plurality of unassigned UE in a home cell of the next top-ranked UE when the different CS of the different DM-RS base sequence is available; and repeatedly assign a different CS of the different DM-RS base sequence to the plurality of unassigned UE in the cooperatively served cell of the next top-ranked UE when the different CS of the different DM-RS base sequence is available.

21. The DM-RS sequence assignment device of claim 15, wherein DM-RS sequence assignment module is further configured to:

select a next top-ranked UE from the list, wherein the next top-ranked UE has a highest number of RP links from remaining UE on the list;

repeatedly assign the different CS of the DM-RS base sequence to a plurality of remaining unassigned UE, in a CoMP set when the different CS of the DM-RS base sequence is available for each remaining unassigned UE in the CoMP set, and when the next top-ranked UE has at least two cells in a next top-ranked UE's CoMP RP set;

assign a different DM-RS base sequence and a CS to the next top-ranked UE when the different CS of the DM-RS base sequence is not available for each remaining unassigned UE in a CoMP set, and when the next top-ranked UE has at least two cells in the next top-ranked UE's CoMP RP set, and repeatedly assign a different CS of the different DM-RS base sequence to the plurality of remaining unassigned UE in a next top-ranked UE's home cell, a next top-ranked UE's cooperatively served cell, and then a next top-ranked UE's cooperatively serving cells when the different CS of the different DM-RS base sequence is available.

22. The DM-RS sequence assignment device of claim 15, wherein DM-RS sequence assignment module is further configured to:

select a next top-ranked UE from the list, wherein the next top-ranked UE has a highest number of RP links from remaining UE on the list;

repeatedly assign the different CS of the DM-RS base sequence to a plurality of unassigned UE in a home cell of the next top-ranked UE when the different CS of the DM-RS base sequence is available for each unassigned UE in the home cell, and when the next top-ranked UE has only one cell in a next top-ranked UE's CoMP RP set or the next top-ranked UE is not configured for UL CoMP;

assign anew DM-RS base sequence and a CS to the next top-ranked UE when the different CS of the DM-RS base sequence is not available for each unassigned UE the home cell of the next-top ranked UE, and repeatedly assign a different CS of the new DM-RS base sequence to the plurality of remaining unassigned UE in a next top-ranked UE's home cell, a next top-ranked UE's cooperatively served cell, and then a next top-ranked UE's cooperatively serving cells when the different CS of the new DM-RS base sequence is available.

23. The DM-RS sequence assignment device of claim 15, wherein the UE is configured to connect to at least one of a wireless local area network (WLAN), a wireless personal area network (WPAN), and a wireless wide area network (WWAN), wherein the UE includes an antenna, a touch sensitive display screen, a speaker, a microphone, a graphics processor, an application processor, internal memory, a non-volatile memory port, or combinations thereof.

24. The DM-RS sequence assignment device of claim 15, wherein the DM-RS sequence assignment device is included in an evolved packet core (EPC) or a node, wherein the node is selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof, 25. A method for user equipment (UE)-specific assigning of demodulation reference signal (DM-RS) sequences to support uplink (UL) coordinated multipoint (CoMP), comprising:
- determining a number of reception point (RP) links for each UE of a plurality of UE scheduled for uplink transmission in a CoMP set;
- sorting the plurality of UE into a list according to a number of reception point (RP) links for each UE of a plurality of UE in a CoMP set;
- assigning a DM-RS base sequence and a cyclic shift (CS) to a top-ranked UE from the list, wherein the top-ranked UE has a highest number of RP links;
- repeatedly assigning a different CS of the DM-RS base sequence to a plurality of unassigned UE in a same cell as the top-ranked UE when the different CS of the DM-RS base sequence is available, wherein each DM-RS base sequence includes a plurality of CS; and
- repeatedly assigning the different CS of the DM-RS base sequence to a plurality of unassigned UE a cooperatively served cell of the top-ranked UE when the different CS of the DM-RS base sequence is available for each UE in the cooperatively served cell of the top-ranked UE, wherein the cooperatively served cell of the top-ranked UE is a cell within the CoMP set that has a scheduled UE that is cooperatively served by the home cell of the top-ranked UE.

26. The method of claim 25, further comprising:
- assigning a different DM-RS base sequence and a CS to a next top-ranked UE from the list when the different CS of the DM-RS base sequence is not available for each UE in the cooperatively served cell of the top-ranked UE, wherein the next top-ranked UE has a highest number of RP links from remaining UE on the list;
- repeatedly assigning a different cyclic shift (CS) of the different DM-RS base sequence to a plurality of unassigned UE in a home cell of the next top-ranked UE when the different CS of the different DM-RS base sequence is available; and
- repeatedly assigning a different CS of the different DM-RS base sequence to the plurality of unassigned UE in the cooperatively served cell of the next top-ranked UE when the different CS of the different DM-RS base sequence is available, wherein a cooperatively served cell of the next top-ranked UE is a cell within the CoMP set that has a scheduled UE that is cooperatively served by the home cell of the next top-ranked UE.

* * * * *